United States Patent
Grealish et al.

(10) Patent No.: US 10,359,919 B2
(45) Date of Patent: Jul. 23, 2019

(54) STAGED ANIMATION OF CHARTS FOR DATA UPDATES

(71) Applicant: Microsoft Technology Licensing, LLC, Redmond, WA (US)

(72) Inventors: Kevin David James Grealish, Seattle, WA (US); Randy Joe Dodgen, Seattle, WA (US); Oscar P. Kozlowski, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/827,265

(22) Filed: Mar. 14, 2013

(65) Prior Publication Data

US 2014/0282124 A1 Sep. 18, 2014

(51) Int. Cl.
| | |
|---|---|
| *G06F 3/048* | (2013.01) |
| *G06F 3/0484* | (2013.01) |
| *G06T 11/20* | (2006.01) |
| *G06T 13/80* | (2011.01) |
| *G06F 3/0485* | (2013.01) |

(52) U.S. Cl.
CPC ........ *G06F 3/04845* (2013.01); *G06F 3/0485* (2013.01); *G06T 11/206* (2013.01); *G06T 13/80* (2013.01)

(58) Field of Classification Search
CPC ............... G06F 3/04847; G06F 3/0488; G06F 17/30864; G06F 17/30867; G06F 3/0481; G06F 3/04842; G06F 17/3053; G06F 3/0484; G06F 17/5009; G06F 19/3418; G06F 2209/545; G06F 3/011; G06F 3/048; G06T 11/206; G06T 13/80

USPC ................................................. 715/861, 730
See application file for complete search history.

(56) References Cited

U.S. PATENT DOCUMENTS

| | | | |
|---|---|---|---|
| 7,454,077 | B1 * | 11/2008 | MacKenzie et al. ......... 382/250 |
| 7,737,979 | B2 | 6/2010 | Robertson et al. |
| 2002/0096812 | A1 | 7/2002 | Reed |
| 2007/0153006 | A1 | 7/2007 | Robbins |

(Continued)

OTHER PUBLICATIONS

Fisher, Danyel, "Animation for Visualization: Opportunities and Drawbacks", Published on: Jun. 2010, Available at: http://research.microsoft.com/pubs/130998/bv_ch19.pdf.

(Continued)

*Primary Examiner* — Tan H Tran
(74) *Attorney, Agent, or Firm* — Workman Nydegger

(57) ABSTRACT

Updating graphical user interface elements. A method includes accessing a graphical user interface which includes an initial view including graphical elements. Each of the following are performed (in order) if determined to be applicable: (1) updating in the graphical user interface any pan elements that are outside of the initial view; (2) animating any changes in axes of the graphical user interface to set the stage for data modifications; (3) performing any data element animations in the graphical user interface, including any moves, any additions, any removals and any changes for all updates except those already added in when updating any pan elements that are outside of the initial view and pan element removals that will not be visible in a final view; (4) animating any changes in the axes to the final view; and (5) updating any remaining elements that are now out of view.

13 Claims, 8 Drawing Sheets

(56) References Cited

U.S. PATENT DOCUMENTS

| | | | |
|---|---|---|---|
| 2008/0192056 A1* | 8/2008 | Robertson | G06T 13/80 345/440 |
| 2009/0096812 A1* | 4/2009 | Boixel | G06T 3/0093 345/646 |
| 2009/0327921 A1 | 12/2009 | Holm-Peterson | |
| 2010/0073377 A1* | 3/2010 | Cai | G06T 13/80 345/440 |
| 2011/0285727 A1 | 11/2011 | Fernandez et al. | |
| 2012/0081386 A1 | 4/2012 | Wiemker et al. | |
| 2012/0313957 A1 | 12/2012 | Fisher et al. | |

OTHER PUBLICATIONS

Heer, et al., "Animated Transitions in Statistical Data Graphics", In Journal of IEEE Transactions on Visualization and Computer Graphics, vol. 13, Issue 6, Nov. 2007, 8 pages.

Nakakoji, et al., "Cognitive Effects of Animated Visualization in Exploratory Visual Data Analysis", In 5th International Conference on Information Visualisation, Jul. 25, 2001, 8 pages.

Pulo, Kevin, "Navani: Navigating Large-Scale Visualisations with Animated Transitions", In 11th International Conference on Information Visualisation, Jul. 4, 2007, 6 pages.

Matsushita, et al., "Interactive Visualization Method for Exploratory Data Analysis", In 5th International Conference on Information Visualisation, Jul. 25, 2001, 6 pages.

Robertson, et al., "Effectiveness of Animation in Trend Visualization," IEEE Transactions on Visualization and Computer Graphics, vol. 14, No. 6, Nov./Dec. 2008, 8 pages.

Vanderdonckt, "Animated Transitions for Empowering Interactive Information Systems," IEEE, 2011, 12 pages.

Heer, et al., "Interactive Dynamics for Visual Analysis," Communications of the ACM, vol. 55, No. 4, Apr. 2012, 10 pages.

"International Search Report and Written Opinion Issued in PCT Application No. PCT/US2014/023107", dated Jul. 22, 2015, 10 pages.

"Create a Motion Bubble Chart", Apr. 2011, Available at <<https://www.youtube.com/watch?v=pt6-Kp9LrbM>>.

"Excel 2013 PowerView Animated Scatterplot/Bubble Chart Business Intelligence Tutorial" Mar. 2013, Available at <<https://www.youtube.com/watch?v=V00lvElq0N0>>.

"Office Action Issued in European Patent Application No. 14713739.2", dated Nov. 13, 2017, 4 pages.

"Office Action Issue in Chinese Patent Application No. 201480015057.7", dated Nov. 30, 2017.

* cited by examiner

STAGED ANIMATION OF CHARTS FOR DATA UPDATES

BACKGROUND

Background and Relevant Art

Computers and computing systems have affected nearly every aspect of modern living. Computers are generally involved in work, recreation, healthcare, transportation, entertainment, household management, etc.

Many computers are intended to be used by direct user interaction with the computer. As such, computers have input hardware and software user interfaces to facilitate user interaction. For example, a modern general purpose computer may include a keyboard, mouse, touchpad, camera, etc. for allowing a user to input data into the computer. In addition, various software user interfaces may be available including graphical user interfaces that provide rich displays. Some graphical user interfaces provide animation to indicate changes in data.

Graphical user interfaces display data. However, as data changes over time in that data is added to a user interface, data is removed from the user interface, or data is changed in the user interface, the changing representations in the user interface may lead to confusion or inaccurate interpretation by a human user. For example, consider the case of a resource tracker showing an amount of network resources being used. When network hardware is in a quiescent state with a minor amount of traffic, the resource tracker may show network usage in a zoomed view, such as by showing the usage on a graph with an axis that has a maximum of 10 Mbs. When the user connects to a video streaming site, network usage may exceed the 10 Mbs limit, and thus the scale is changed to 100 Mbs. However, to the user, the network usage while watching a streaming video may appear to be the same as under a quiescent state due to the scale change. This can be confusing or misleading to the user.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method of updating graphical user interface elements in a fashion that is able to handle data being added to the user interface, data being removed from the user interface, or data being modified in the user interface. The method includes accessing a graphical user interface. The graphical user interface displays an initial view including graphical elements. The method further includes, for each of the following, determining whether or not to perform each act, and performing any of the following that are applicable to a given view scenario, in order: (1) updating in the graphical user interface adding any pan elements that are outside of the initial view; (2) animating any changes in axes of the graphical user interface to set the stage for data modifications; (3) performing any data element animations in the graphical user interface, including any moves, any additions, any removals and any changes for all updates except those already added in when updating any pan elements that are outside of the initial view and pan element removals that will not be visible in a final view; (4) animating any changes in the axes to the final view; and (5) updating any remaining elements that are now out of view.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
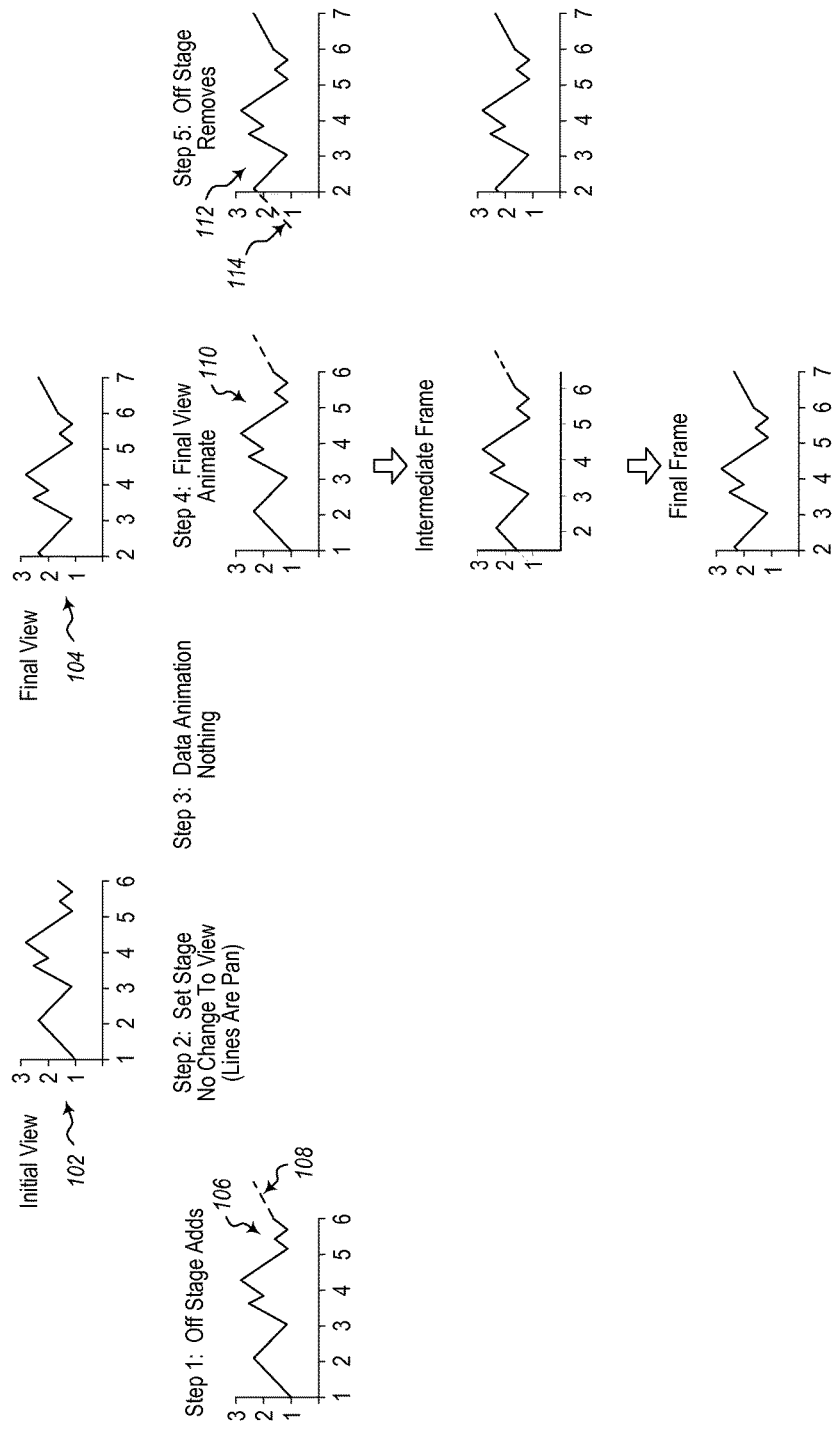
FIG. 1 illustrates a line time series.

Embodiments implement functionality which allows a chart to be animated in reaction to new data such that a human observer is able to track where updated values moved to and how they changed without being misled about value changes. Embodiments may be implemented in a way that can be generalized to virtually all chart types and can stage the animations so as to avoid being misleading. Embodiments may be implemented to make changes to data shown in a chart by animating the transition rather than snapping to the new view, thus allowing a user to visualize changing display conditions.

The following illustrates guiding principles that can be considered in the context of the embodiments described herein.

Embodiments may implement tracking functionality. In particular, animation is used so as to minimize user confusion as to where an element is moved to when watching a change. Humans are generally quite adept at tracking movement and less adept at recognizing where things have gone when they snap to a new layout. This can make non-animated behavior jarring.

Embodiments may be implemented to minimize misleading behavior. A user should not be misled about the data they are displaying For example, if a value is going up relative to other values it should be clear it is going up.

Embodiments may be implemented with animation performance as a factor. In particular, animations should run quickly, but still preserve a sense of knowing where elements went. This results in the UI feeling responsive form a user perspective. This also reduces the opportunity for issues with multiple animations running at once.

While in most cases and especially in the common cases, transitions and animations should be visually appealing, some "quirky" unusual animations may be acceptable.

Embodiments may implement a unified single approach or algorithm that allows a large swath of charts and visualizations to be handled. Thus, rather than implementing specialized algorithms for each specialized case, a single approach or algorithm allows the one method to be used for many chart types or chart element types.

The following now illustrates a number of common examples of where the functionality may be of particular use:

Consider a line chart with new data added at one end and old data removed from the other, often the same portion of the other axis. An example of such a chart may be a chart of real time stock quotes. This chart should appear as a line smoothly scrolling in from the left (or right) with new data points sliding into view and old data points sliding out of view. This should not be performed by first creating space on the chart and then having data points appear, nor should this be performed by having data points disappear and then having the space where the data points disappeared from removed. Rather, data points should slide into view and out of view. Further, there should be no ripple effect where the added and removed portions are animated one after the other making the other axis scaling change before returning to its original value.

In another example, consider a line chart with new data added at one end and old data removed from the other as above, but now with the addition of an entirely new line. The entirely new line (i.e. a new series) should not be partially panned in and then have the remainder faded in.

In yet another example consider scatter plots where points move and new items appear outside the old range and items inside and outside the new view disappear. It should be clear that scatter points are added and removed by having them appear/disappear. Having added scatter points pan into view or removed ones pan out of view while others appear and disappear in sight can leave the user confused. They can be left feeling that the points panned away still exist while those they saw disappear no longer do. Similar to those that panned into view versus those they saw appear; a user may not know whether or not those that panned into view existed before. This effect can be made worse if the view shift and appearance and disappearance are separated in time.

In yet another example consider a column chart where one column goes up in value, causing a y-axis scale change. The bar should appear to grow up, not have all others just shrink (which is what happens if the scales and the column animate together). The scale change should occur first and then the data value change to prevent the user from being misled.

In yet another example consider a column chart where the tallest column goes down in value, causing the y-axis scale to change. The bar should appear to go down, not have all the others just grow up (which is what happens if the scales and the column animate together). Note this requires a different order of animation than the column growth case with the data change happening before the scale change.

In yet another example consider new categories appearing in the middle of an existing set of categories. The existing elements should move smoothly as the space is created and the new elements appear. This is done by staging the changes as remove elements, moving elements and then adding elements.

Embodiments achieve desired functionality by causing chart elements to be typed as either those where panning into and out of the view when being created or removed is acceptable (pan elements) and those where this would be confusing and all creation and removal should be seen by the user (non-pan elements). It would be common for lines and bars to be pan elements and scatter plots points to be non-pan elements and this is indeed what is used in the examples in the Figures. In particular, it is acceptable for added line segments to pan into view and removed ones to pan out of view as well as appear and disappear in the center of the view as this does not create undue confusion and is actually desirable in the scrolling stock case mentioned above. Having scatter points that pan out of view and others that disappear will create confusion as to which points still exist. The same applies to seeing some points pan into view and then others appear. This effect is amplified when the pan and appear/disappear animations are separated in time.

In all of the following axis scale/view changes only occur when the axis scale is automatic. If the user has zoomed in (and potentially panned) or the axis ranges have been set to fixed, then the view changes on that axis do not occur.

Figure 8:
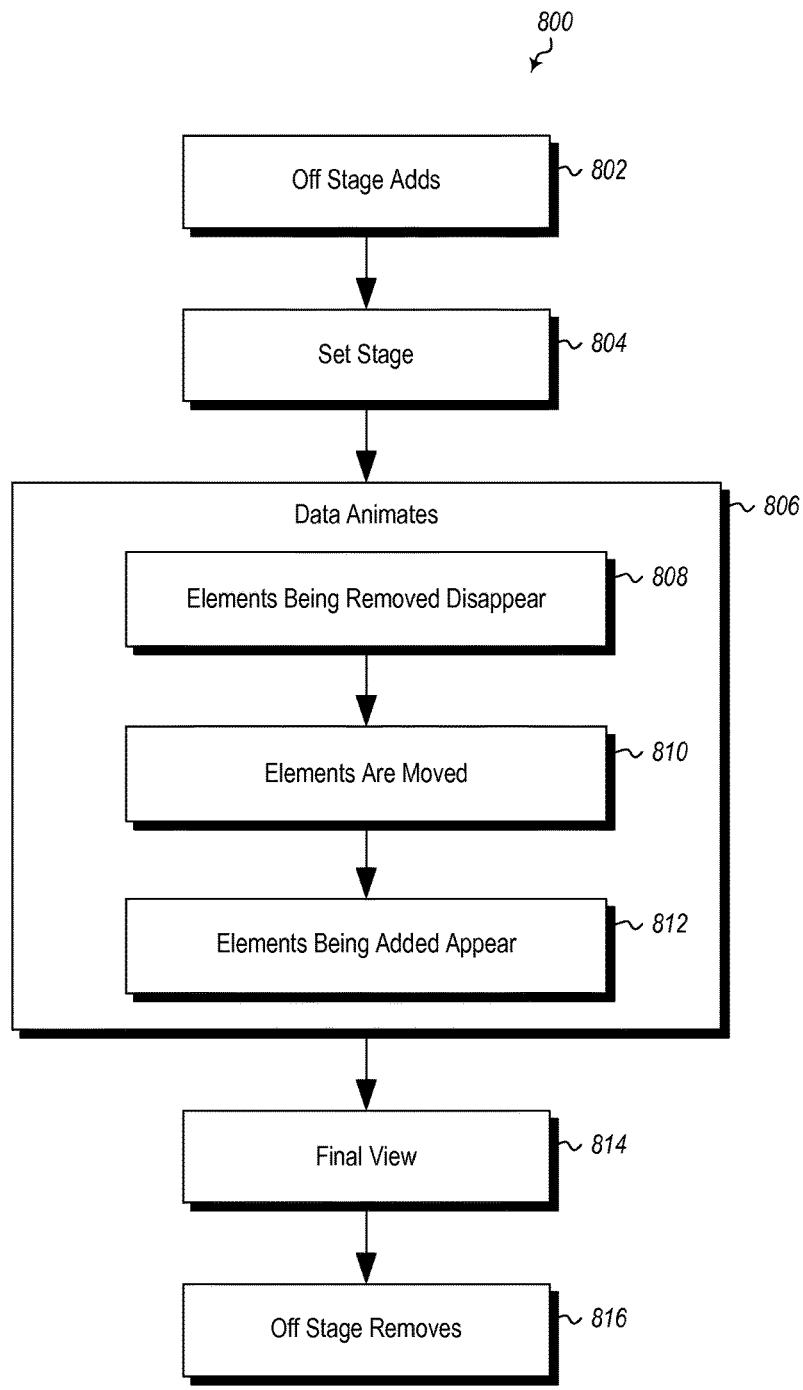
FIG. 8 illustrates a method of updating graphical user interface elements.

The following illustrates a process including actions that can be followed to animate change. The following process steps are performed in the order indicated. However, as noted in the explanations below, some steps (or sub steps) may have portions of the steps performed at the same time. The following process is illustrated graphically in FIG. 8 as a method 800.

1. Off stage adds (802). This involves instantly, or as soon as practicable, updating any pan elements that are outside of the initial (old) view. These, most commonly, are elements for added data such as new bars, categories or line segments where they are not in the current view. Scatter plot points are non-pan elements so would not be added in this step. Entirely new series should be excluded so the entire series will appear together later.
2. Set Stage (804). This involves animating a change in the axes/view to set the stage for data modifications. This will include adjusting the view to at least the initial (old) view but will expand to accommodate new locations of moved elements and non-pan elements that will be added. It does not expand to include pan elements added in the "off stage adds" step, although it could reveal them.
3. Data Animates (806). Perform the data element animations, including moves, additions, removals and changes for all updates except those already added in the "Off stage adds" step and pan element removals that will not be visible in the final view. To avoid some overlapping elements cases (moving elements overlapping elements being removed and moving elements overlapping with items being added) this animation is staged in three steps:

a. Elements being removed disappear (808). This may generally be done by fading elements out, but in some embodiments may be done by snapping elements out.

b. Elements are moved and/or changed (810).

c. Elements being added appear (812). This may generally be done by fading elements in, but in some embodiments may be done by snapping elements in.

4. Final View (814). Animate a change in the axes/view to the final (new) view. This final view should only ever be smaller than the "stage set" view.

5. Off Stage Removes (816). Instantly, or as soon as practicable, update any remaining elements that are now out of view. This should only be pan elements that are now out of view.

If "Data Animates" stage has an empty set of elements to animate, then the both the "Set Stage" and "Data Animate" Stages are skipped. This eliminates the ripple in cases such as the real-time stock chart case illustrated above.

The "Set Stage" animation and "Data Animates" part "a", removals, can run concurrently.

The "Final View" animation and "Data Animates" part "c", additions, can run concurrently.

Chart elements perform different animations for new elements (appearance) than for changing elements. Elements may be configured to not animate appearance as a change from zero.

When changing view, either because the user is performing pan or zoom or due to data change animations, ticks, their labels on axes and the gridlines should all move with the pan/zoom and then cross-fade to new tick labels and lines for the new layout after the pan/zoom is complete. Snapping to new ticks, tick labels and gridlines on every frame produces a very confusing result with no continuity. This would prevent system users from tracking the change.

Timing of the animations is not specified here as the method should be the same regardless of the timings chosen for each stage.

Easing for view changes or element movements is not specified here as the method should work with any easing (or lack of it) in the animations.

A number of examples are now illustrated where the process described above is applied in a number of different cases. Referring now to FIG. 1, a line time series with no vertical change is illustrated. FIG. 1 illustrates an initial view 102 and a final view 104. FIG. 1 also illustrates determinations of which of the five steps described above are applied and how they are applied. For example, at 106, FIG. 1 illustrates step 1, off stage adds. In particular, in step 1, a line segment 108 is added. The line segment 108, while being added, is not visible, but rather is clipped.

A determination is made that step 2 does not need to be applied. In particular, there is no need to change the axes or view, as the line segment 108 will simply pan into view.

A determination is made that step 3 does not need to be applied, as the only changes made are off stage adds, which are specifically excluded from the data animation of step 3.

FIG. 1 illustrates at 110 three frames of the animation performed by the step 4 final view animation. The line segment 108 pans into view while other portions of the view pan out of view. In the animation frames shown at 110, the dotted lines illustrate line segments that are not visible to the user, but rather are clipped in the view. Note that the horizontal axis also is panned in the animation.

FIG. 1 illustrates at 112 step 5, off stage removes. In particular, following the animation of step 4, a line segment 114 is panned out of view and clipped in the view. At step 5, the line segment 114 is removed.

Figure 2:
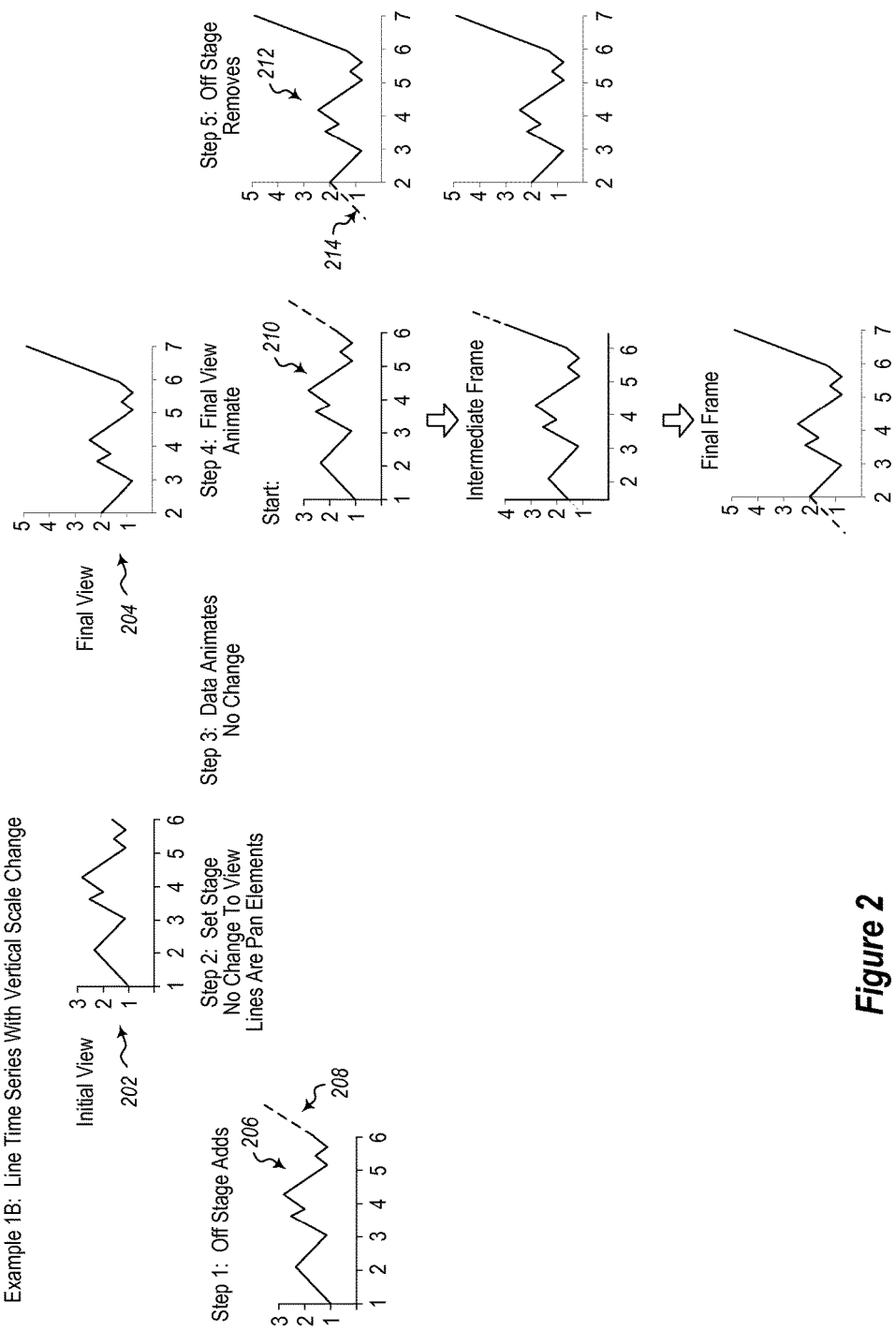
FIG. 2 illustrates a line time series with vertical scale change.

FIG. 2 illustrates an alternate example similar to that shown in FIG. 1, except that the nature of the added line segment 208 is such that the vertical is changed to accommodate the added line segment 208. FIG. 2 illustrates an initial view 202 and a final view 204. FIG. 2 also illustrates determinations of which of the five steps described above are applied and how they are applied. For example, at 206, FIG. 2 illustrates step 1, off stage adds. In particular, in step 1, a line segment 208 is added. The line segment 208, while being added, is not visible, but rather is clipped.

A determination is made that step 2 does not need to be applied. In particular, there is no need to change the axes or view, as the line segment 208 will simply pan into view.

A determination is made that step 3 does not need to be applied, as the only changes made are off stage adds, which are specifically excluded from the data animation of step 3.

FIG. 2 illustrates at 210 three frames of the animation performed by the step 4 final view animation. The line segment 208 pans into view while other portions of the view pan out of view. In the animation frames shown at 210, the dotted lines illustrate line segments that are not visible to the user, but rather are clipped in the view. Note that the horizontal axis also is changing in the animation.

FIG. 2 illustrates at 212 step 5, off stage removes. In particular, following the animation of step 4, a line segment 214 is panned out of view and clipped in the view. At step 5, the line segment 214 is removed.

Figure 3:
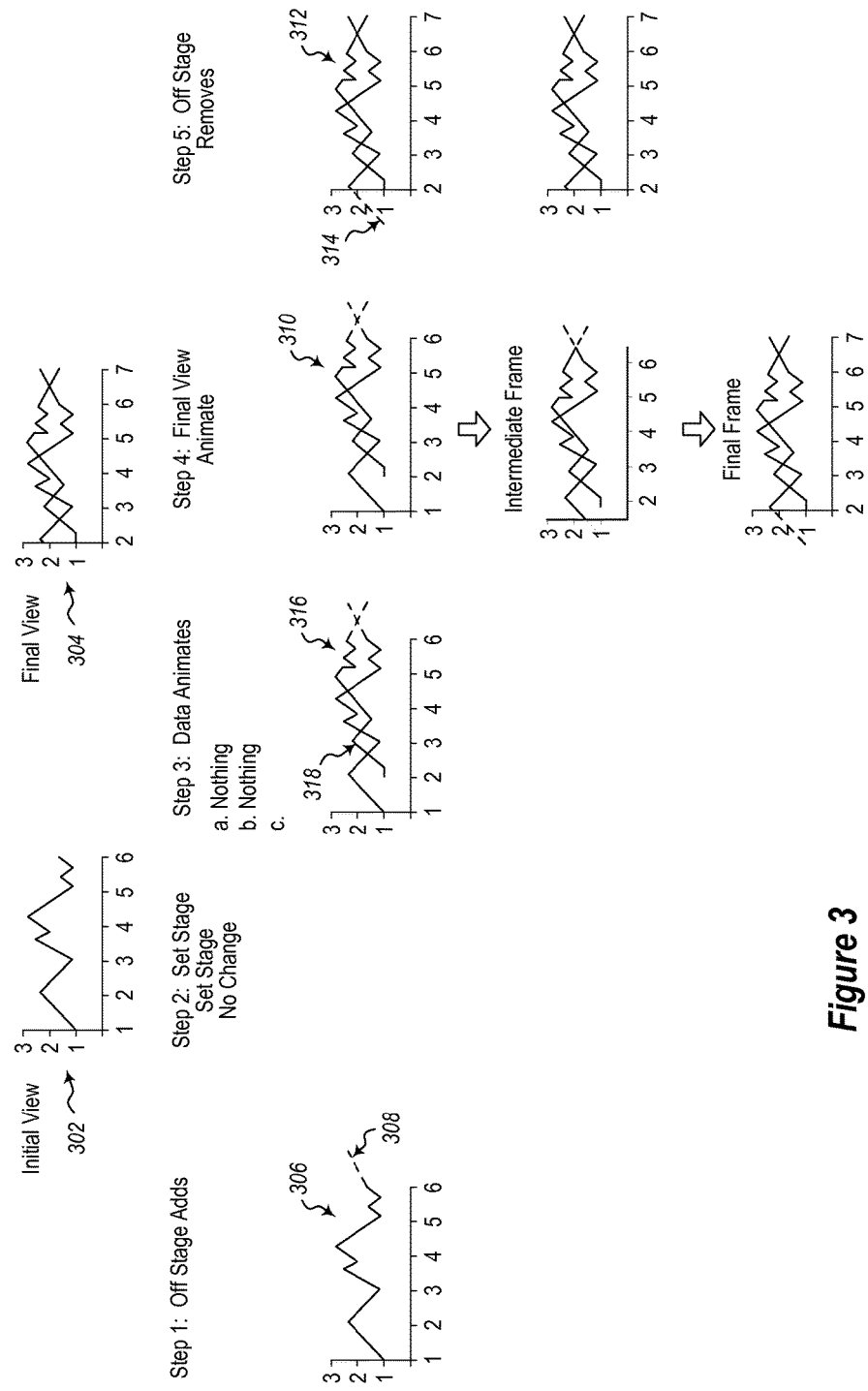
FIG. 3 illustrates a line time series with the addition of a series.

FIG. 3 illustrates another example where a new line series is added to a view. FIG. 3 illustrates an initial view 302 and a final view 304. FIG. 3 also illustrates determinations of which of the five steps described above are applied and how they are applied. For example, at 306, FIG. 3 illustrates step 1, off stage adds. In particular, in step 1, a line segment 308 is added. The line segment 308, while being added, is not visible, but rather is clipped.

A determination is made that step 2 does not need to be applied. In particular, there is no need to change the axes or view, as the line segment 308 will simply pan into view.

At step 3 data animation, as illustrated at 316 is performed. In step 3, no elements are removed or moved, but the line series 318 is added. The line series 318 can be faded in or snapped in.

FIG. 3 illustrates at 310 three frames of the animation performed by the step 4 final view animation. The line segment 308 pans into view while other portions of the view pan out of view. Further, portions of the line series 318 pan into view while no portions of the line series 318 pan out of view. In the animation frames shown at 310, the dotted lines illustrate line segments that are not visible to the user, but rather are clipped in the view. Note that the horizontal axis also is panned in the animation.

FIG. 3 illustrates at 312 step 5, off stage removes. In particular, following the animation of step 4, a line segment 314 is panned out of view and clipped in the view. At step 5, the line segment 314 is removed.

Figure 4:
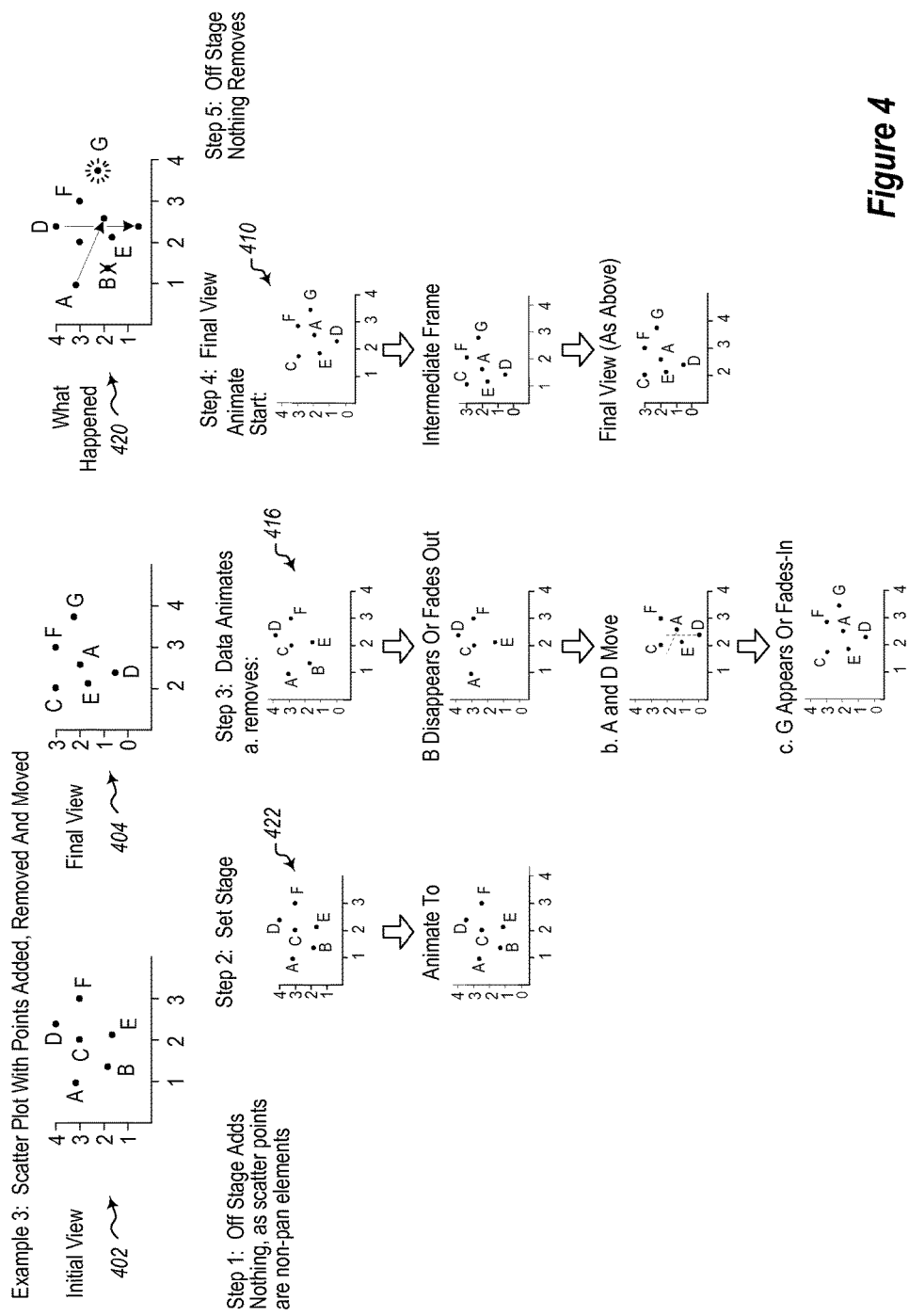
FIG. 4 illustrates a scatter plot with points added, removed and moved.

FIG. 4 illustrates a scatter plot example where points are added, points are removed, and points are moved in the scatter plot. FIG. 4 illustrates an initial view 402, a final view 404, and a summarization 420 of what happened. FIG. 4 illustrates a scatter plot. As scatter points are non-pan elements, no off stage adds are performed. FIG. 4 illustrates at 422 that set stage actions are performed where the horizontal axis is changed by animation. FIG. 4 illustrates at 416 that data animates by animating point removals, point movements, and point additions. FIG. 4 illustrates at 410, animation to the final view. Again, as this is a scatter plot, no off stage removes are performed.

Figure 5:
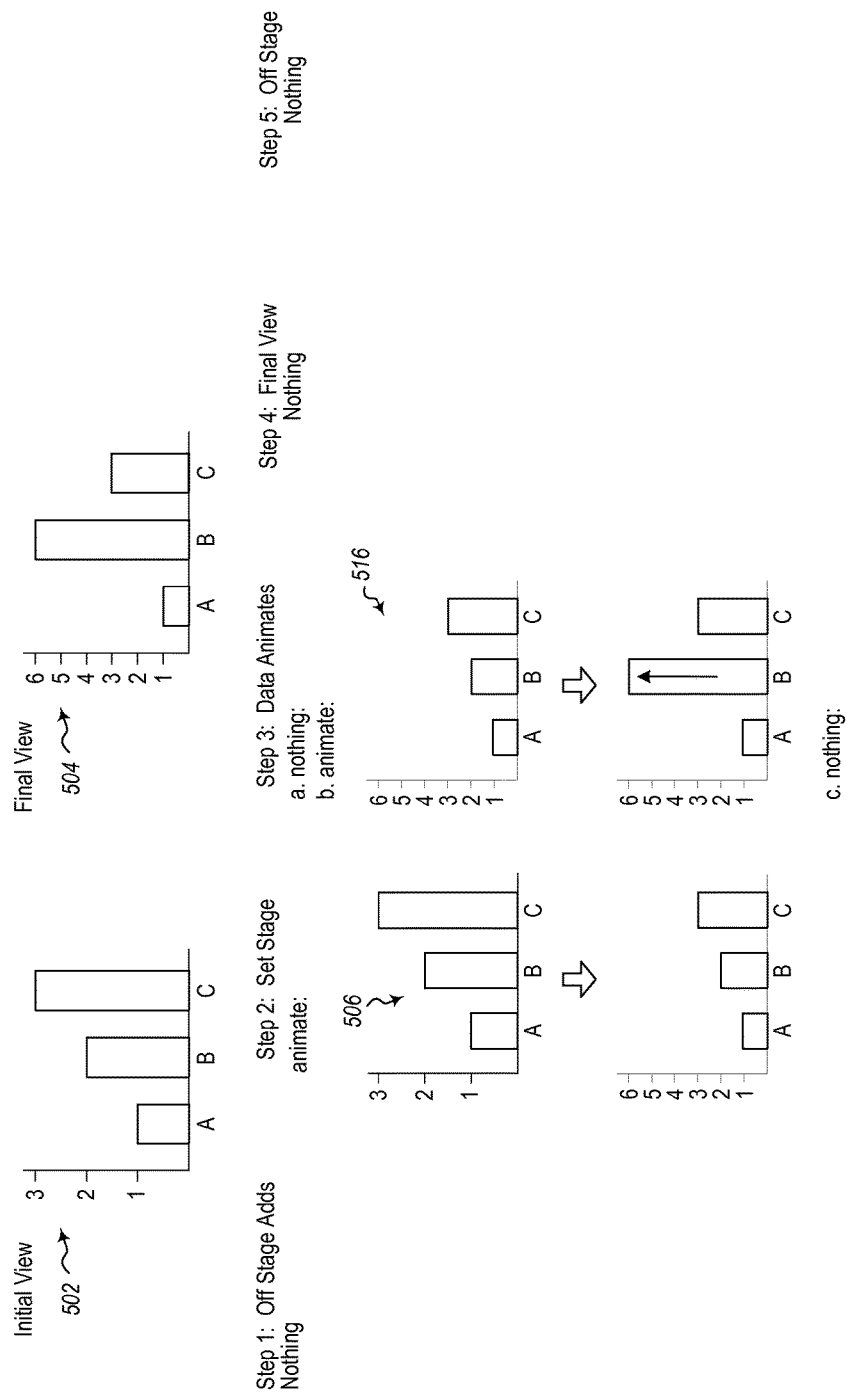
FIG. 5 illustrates a bar chart with an increasing bar.

FIG. 5 illustrates a bar chart animation with one bar increasing in magnitude, including an initial view 502 and a final view 504. In this example, there are no off stage adds. As illustrated at 506 that set stage actions are performed where the vertical axis is changed by animation. At 516, FIG. 5 illustrates the data animates step by animating a change to bar "B". No final view animations or off stage remove animations are performed for this particular example.

Figure 6:
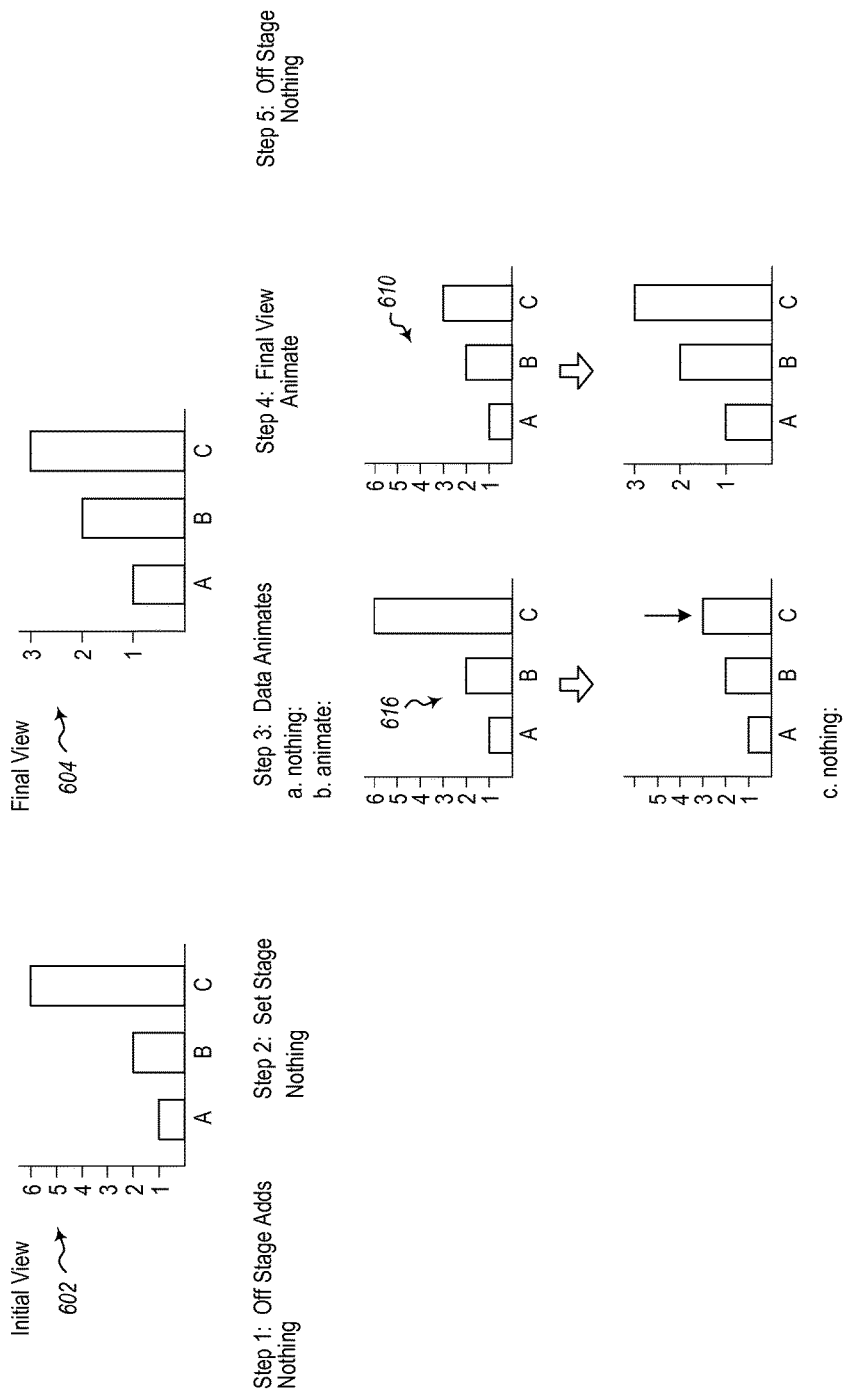
FIG. 6 illustrates a bar chart with a decreasing bar.

Referring now to FIG. 6, an example of a bar chart animation with one bar decreasing is illustrated, including an initial view 602 and a final view 604. In this example, there are no off stage adds. At 616, FIG. 6 illustrates the data animates step by animating a change to bar "C". At 610, FIG. 6 illustrates that the final view animation which causes the vertical axis to animate to a smaller scale (also causing the bars "A", "B" and "C" to animate to match the scale. No off stage remove animations are performed for this particular example.

Figure 7:
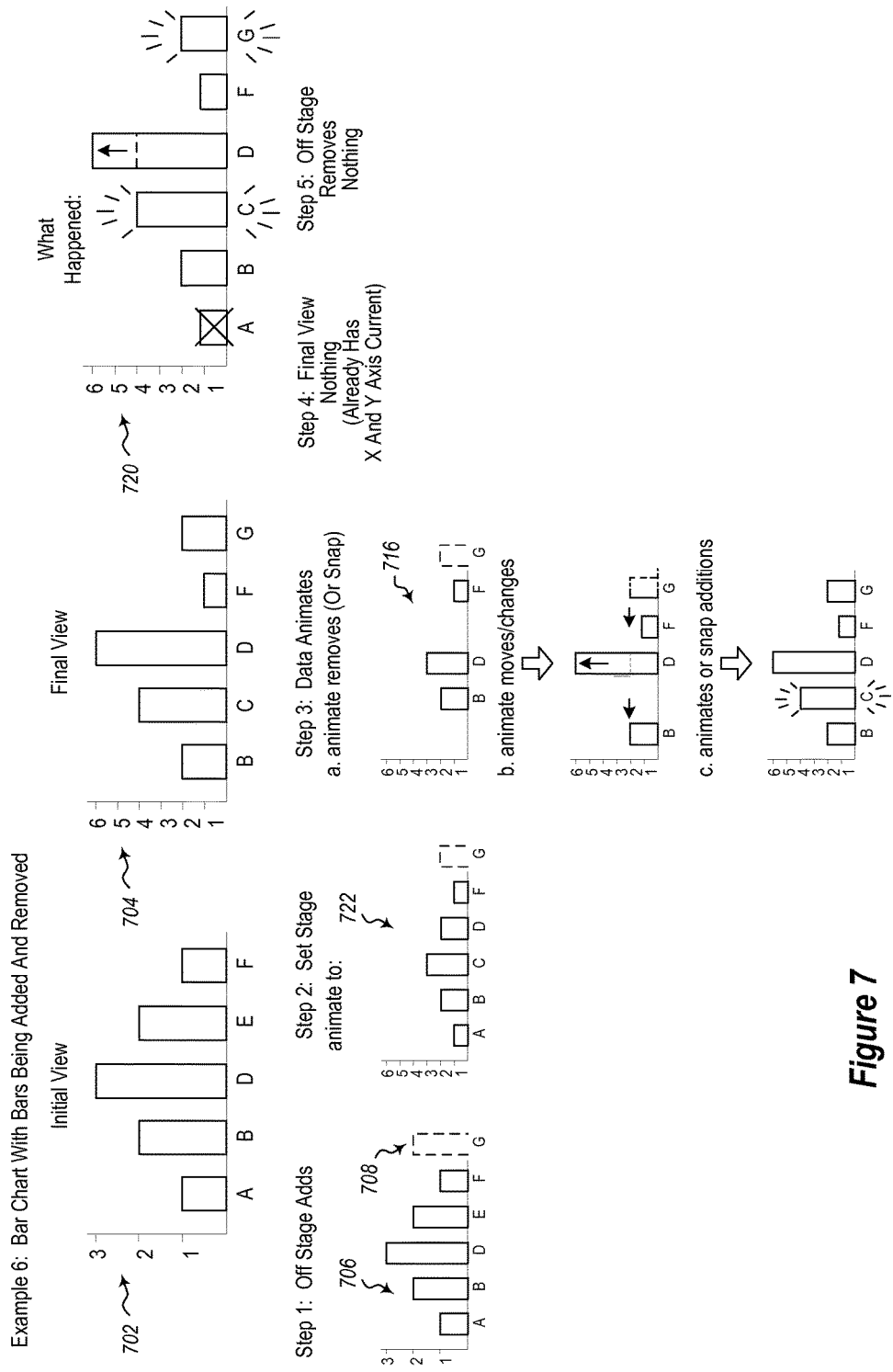
FIG. 7 illustrates a bar chart with bars changing, being added and removed.

Referring now to FIG. 7, another example is illustrated which illustrates a bar chart where bars being added and removed as illustrated in an initial view 702, a final view 704 and a summary 720 illustrating what happened. As illustrated at 706, off stage adds are performed to add a new bar "G" as illustrated at 708. As illustrated at 722, set stage animation is performed to expand the vertical axis and to shrink the bars A, B, D, E and F to match the new scaling. At 716, the data animates step is performed where (a) removals are animated or snapped out of view, including bars A, and E; (b) moves and changes are animated as illustrated by the horizontal axis moving to the left, bar D growing in size, and bar G panning into view; and (c) new bar C is added. In this example, no final view animations are needed as the horizontal and vertical axis are already correct. No off stage removes are needed for this example.

Methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for updating graphical user interface elements in a fashion that is able to handle data being added to the user interface, data being removed from the user interface, or data being modified in the user interface, the system comprising:
   one or more processors; and
   one or more computer readable media, wherein the one or more computer readable media comprise computer executable instructions that when executed by at least one of the one or more processors cause at least one of the one or more processors to perform the following:
      accessing a graphical user interface, the graphical user interface displaying an initial view comprising graphical elements;
      for each of acts (1), (2), (3), (4), and (5), specified below,
         determining whether or not to perform each of acts (1), (2), (3), (4), and (5), by determining whether each of acts (1), (2), (3), (4), and (5) is applicable to a given view scenario, and
         performing, in the order specified below, each of acts (1), (2), (3), (4), and (5) which have been determined to be applicable to the given view scenario:
            (1) updating in the graphical user interface any pan elements that are outside of the initial view;
            (2) animating any changes in axes of the graphical user interface to set the stage for data modifications;
            (3) performing any data element animations in the graphical user interface, including any moves, any additions, any removals and any changes for all updates except those already added in when updating any pan elements that are outside of the initial view and pan element removals that will not be visible in a final view;
            (4) animating any changes in the axes to the final view; and
            (5) updating any remaining elements that are now out of view.

2. The system of claim 1, wherein performing any data element animations in the graphical user interface comprises performing the following, in order:
   d. causing any elements being removed to disappear;
   e. moving any elements that are to be moved;
   f. causing any elements being added to appear.

3. The system of claim 2, wherein causing any elements being removed to disappear comprises causing any elements being removed to fade out of view.

4. The system of claim 2, wherein causing any elements being added to appear comprises causing any elements being added to fade into view.

5. The system of claim 2, wherein at least a portion of causing any elements being removed to disappear is performed concurrently with at least a portion of animating any changes in axes of the graphical user interface to set the stage for data modifications.

6. The system of claim 2, wherein at least a portion of causing any elements being added to appear is performed concurrently with at least a portion of animating any changes in the axes to the final view.

7. The system of claim 1, wherein updating any remaining elements that are now out of view comprises removing out of view elements.

8. A computer program product comprising at least one physical computer readable storage medium having encoded thereon computer executable instructions that, when executed by one or more processors, causes the following to be performed:
   accessing a graphical user interface, the graphical user interface displaying an initial view comprising graphical elements;
   for each of acts (1), (2), (3), (4), and (5), specified below,
      determining whether or not to perform each of acts (1), (2), (3), (4), and (5), by determining whether each of acts (1), (2), (3), (4), and (5) is applicable to a given view scenario, and
      performing, in the order specified below, each of acts (1), (2), (3), (4), and (5) which have been determined to be applicable to the given view scenario:
         (1) updating in the graphical user interface any pan elements that are outside of the initial view;
         (2) animating any changes in axes of the graphical user interface to set the stage for data modifications;
         (3) performing any data element animations in the graphical user interface, including any moves, any additions, any removals and any changes for all updates except those already added in when updating any pan elements that are outside of the initial view and pan element removals that will not be visible in a final view;
         (4) animating any changes in the axes to the final view; and
         (5) updating any remaining elements that are now out of view.

9. The computer program product of claim 8, wherein performing any data element animations in the graphical user interface comprises performing the following, in order:
   g. causing any elements being removed to disappear;
   h. moving any elements that are to be moved;
   causing any elements being added to appear.

10. The computer program product of claim 9, wherein causing any elements being removed to disappear comprises causing any elements being removed to fade out of view.

11. The computer program product of claim 9, wherein causing any elements being added to appear comprises causing any elements being added to fade into view.

12. The computer program product of claim 9, wherein at least a portion of causing any elements being removed to disappear is performed concurrently with at least a portion of animating any changes in axes of the graphical user interface to set the stage for data modifications.

13. The computer program product of claim 9, wherein at least a portion of causing any elements being added to appear is performed concurrently with at least a portion of animating any changes in the axes to the final view.

* * * * *